(12) United States Patent
McGhie et al.

(10) Patent No.: US 8,267,315 B1
(45) Date of Patent: *Sep. 18, 2012

(54) EXCHANGE OF NON-NEGOTIABLE CREDITS FOR ENTITY INDEPENDENT FUNDS

(76) Inventors: Sean I. McGhie, Boca Raton, FL (US); Brian K. Buchheit, Davie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,417

(22) Filed: May 24, 2012

Related U.S. Application Data

(63) Continuation of application No. 11/420,255, filed on May 25, 2006, now Pat. No. 7,703,673.

(51) Int. Cl.
*G06K 5/00* (2006.01)

(52) U.S. Cl. ......... 235/380; 235/375; 235/379; 235/487

(58) Field of Classification Search .................. 235/380, 235/375, 379, 487, 486, 382
See application file for complete search history.

(56) References Cited

U.S. PATENT DOCUMENTS

| | | |
|---|---|---|
| 3,918,716 A | 11/1975 | Nonaka et al. |
| 4,518,098 A | 5/1985 | Fleischer |
| 4,582,324 A | 4/1986 | Koza et al. |
| 4,607,155 A | 8/1986 | Nao et al. |
| 4,621,814 A | 11/1986 | Stephan et al. |
| 4,695,053 A | 9/1987 | Vazquez |
| 4,764,666 A | 8/1988 | Bergeron |
| 4,882,473 A | 11/1989 | Bergeron |
| 4,941,090 A | 7/1990 | McCarthy |
| 4,942,090 A | 7/1990 | Morin |
| 4,968,873 A | 11/1990 | Dethloff |
| 5,038,022 A | 8/1991 | Lucero |
| 5,105,184 A | 4/1992 | Pirani et al. |
| 5,117,355 A | 5/1992 | McCarthy |
| 5,135,224 A | 8/1992 | Yamamoto |
| 5,179,517 A | 1/1993 | Sarbin et al. |
| 5,202,826 A | 4/1993 | McCarthy |
| 5,265,874 A | 11/1993 | Dickinson |
| 5,276,312 A | 1/1994 | McCarthy |

(Continued)

FOREIGN PATENT DOCUMENTS

AU        6484498        11/1998

(Continued)

OTHER PUBLICATIONS

Notice of Allowance; U.S. Appl. No. 13/441,365; Mailing Date Jun. 16, 2012.

(Continued)

*Primary Examiner* — Edwyn Labaze
(74) *Attorney, Agent, or Firm* — Sean I. McGhie; Brian K. Buccheit

(57) ABSTRACT

In one embodiment, credits earned by an end-user from previous interactions between the end-user and an entity can be stored. The storing of credits can alter one or more records of a credit account. The credit account is owned or controlled by the entity. A quantity of the credits of the credit account is identified. This quantity is applied to a purchase in accordance with a credit to funds ratio. Applying the quantity of the credits reduces a number of credits in the credit account as indicated by the records. Funds are transferred to a funds account based on the quantity of stored credits applied to the purchase and the credit to funds ratio. The fund account is not owned or controlled by the entity.

60 Claims, 3 Drawing Sheets

U.S. PATENT DOCUMENTS

| | | | |
|---|---|---|---|
| 5,287,269 A | 2/1994 | Dorrough et al. |
| 5,290,033 A | 3/1994 | Bittner et al. |
| 5,332,076 A | 7/1994 | Ziegert |
| 5,344,144 A | 9/1994 | Cannon |
| 5,371,345 A | 12/1994 | LeStrange et al. |
| 5,397,125 A | 3/1995 | Adams |
| 5,398,932 A | 3/1995 | Eberhardt et al. |
| 5,402,872 A | 4/1995 | Clurman |
| 5,429,361 A | 7/1995 | Raven et al. |
| 5,470,079 A | 11/1995 | LeStrange et al. |
| 5,537,314 A | 7/1996 | Kanter |
| 5,551,692 A | 9/1996 | Pettit et al. |
| 5,564,546 A | 10/1996 | Molbak et al. |
| 5,580,309 A | 12/1996 | Piechowiak |
| 5,609,337 A | 3/1997 | Clapper, Jr. |
| 5,613,912 A | 3/1997 | Slater |
| 5,635,696 A | 6/1997 | Dabrowski |
| 5,643,088 A | 7/1997 | Vaughn et al. |
| 5,655,961 A | 8/1997 | Acres et al. |
| 5,672,109 A | 9/1997 | Natanian |
| 5,674,123 A | 10/1997 | Roberson, Jr. et al. |
| 5,689,100 A | 11/1997 | Carrithers |
| 5,697,611 A | 12/1997 | Kelly et al. |
| 5,725,428 A | 3/1998 | Achmuller |
| 5,761,647 A | 6/1998 | Boushy |
| 5,766,075 A | 6/1998 | Cook et al. |
| 5,769,716 A | 6/1998 | Saffari et al. |
| 5,774,870 A | 6/1998 | Storey |
| 5,779,549 A | 7/1998 | Walker et al. |
| 5,806,045 A | 9/1998 | Biorge et al. |
| 5,809,482 A | 9/1998 | Strisower |
| 5,816,918 A | 10/1998 | Kelly et al. |
| 5,820,460 A | 10/1998 | Fulton |
| 5,823,874 A | 10/1998 | Adams |
| 5,833,536 A | 11/1998 | Davids et al. |
| 5,836,817 A | 11/1998 | Acres |
| 5,851,148 A | 12/1998 | Brune et al. |
| D404,436 S | 1/1999 | McGahn et al. |
| RE36,116 E | 2/1999 | McCarthy et al. |
| 5,876,284 A | 3/1999 | Acres et al. |
| 5,882,261 A | 3/1999 | Adams |
| 5,882,262 A | 3/1999 | Balhorn |
| 5,902,184 A | 5/1999 | Bennett |
| 5,902,983 A | 5/1999 | Crevelt et al. |
| 5,909,486 A | 6/1999 | Walker et al. |
| 5,911,418 A | 6/1999 | Adams |
| 5,919,091 A | 7/1999 | Bell et al. |
| 5,923,016 A | 7/1999 | Fredregill et al. |
| 5,935,000 A | 8/1999 | Sanchez, III |
| 5,937,391 A | 8/1999 | Ikeda et al. |
| 5,941,771 A | 8/1999 | Haste, III |
| 5,941,772 A | 8/1999 | Paige |
| 5,943,241 A | 8/1999 | Nichols et al. |
| 5,946,664 A | 8/1999 | Ebisawa |
| 5,947,820 A | 9/1999 | Morro et al. |
| 5,949,042 A | 9/1999 | Dietz, II et al. |
| 5,951,397 A | 9/1999 | Dickinson |
| 5,956,038 A | 9/1999 | Rekimoto |
| 5,970,470 A | 10/1999 | Walker |
| 5,974,135 A | 10/1999 | Breneman et al. |
| 5,980,385 A | 11/1999 | Clapper |
| 5,983,196 A | 11/1999 | Wendkos |
| 5,991,736 A | 11/1999 | Ferguson et al. |
| 5,993,316 A | 11/1999 | Coyle |
| 6,003,013 A | 12/1999 | Boushy |
| 6,007,426 A | 12/1999 | Kelly et al. |
| 6,009,458 A | 12/1999 | Hawkins |
| 6,014,594 A | 1/2000 | Heidel |
| 6,015,344 A | 1/2000 | Kelly |
| 6,032,955 A | 3/2000 | Luciano et al. |
| 6,036,601 A | 3/2000 | Heckel |
| 6,039,648 A | 3/2000 | Guinn |
| 6,048,269 A | 4/2000 | Burns |
| 6,061,660 A | 5/2000 | Eggleston |
| 6,062,980 A | 5/2000 | Luciano |
| 6,068,533 A | 5/2000 | Parker |
| 6,068,553 A | 5/2000 | Parker |
| 6,089,982 A | 7/2000 | Holch |
| 6,098,837 A | 8/2000 | Izawa |
| 6,110,041 A | 8/2000 | Walker et al. |
| 6,113,098 A | 9/2000 | Adams |
| 6,113,495 A | 9/2000 | Walker et al. |
| 6,119,229 A | 9/2000 | Martinez |
| 6,139,431 A | 10/2000 | Walker et al. |
| 6,141,653 A | 10/2000 | Conklin |
| 6,141,684 A | 10/2000 | McDonald et al. |
| 6,165,071 A | 12/2000 | Weiss |
| 6,178,408 B1 | 1/2001 | Copple |
| 6,183,362 B1 | 2/2001 | Boushy |
| 6,183,366 B1 | 2/2001 | Goldberg et al. |
| 6,186,893 B1 | 2/2001 | Walker et al. |
| 6,186,894 B1 | 2/2001 | Mayeroff |
| 6,224,483 B1 | 5/2001 | Mayeroff |
| 6,229,533 B1 | 5/2001 | Farmer |
| 6,231,442 B1 | 5/2001 | Mayeroff |
| 6,234,896 B1 | 5/2001 | Walker et al. |
| 6,267,671 B1 | 7/2001 | Hogan |
| 6,273,820 B1 | 8/2001 | Haste, III |
| 6,280,326 B1 | 8/2001 | Saunders |
| 6,280,328 B1 | 8/2001 | Holch |
| 6,289,261 B1 | 9/2001 | Heidel |
| 6,293,865 B1 | 9/2001 | Kelly et al. |
| 6,293,867 B1 | 9/2001 | Heidel |
| 6,302,793 B1 | 10/2001 | Fertitta |
| 6,306,035 B1 | 10/2001 | Kelly |
| 6,311,976 B1 | 11/2001 | Yoseloff |
| 6,312,333 B1 | 11/2001 | Acres |
| 6,315,665 B1 | 11/2001 | Faith |
| 6,327,573 B1 | 12/2001 | Walker et al. |
| 6,332,099 B1 | 12/2001 | Heidel |
| 6,341,353 B1 | 1/2002 | Herman |
| 6,352,175 B2 | 3/2002 | Izawa |
| 6,358,149 B1 | 3/2002 | Schneider et al. |
| 6,394,907 B1 | 5/2002 | Rowe |
| 6,476,830 B1 | 11/2002 | Farmer |
| 6,491,584 B2 | 12/2002 | Graham |
| 6,511,377 B1 | 1/2003 | Weiss |
| 6,533,664 B1 | 3/2003 | Crumby |
| 6,554,705 B1 | 4/2003 | Cumbers |
| 6,572,471 B1 | 6/2003 | Bennett |
| 6,579,179 B2 | 6/2003 | Poole |
| 6,609,969 B1 | 8/2003 | Luciano |
| 6,609,970 B1 | 8/2003 | Luciano |
| 6,609,978 B1 | 8/2003 | Paulsen |
| 6,623,357 B2 | 9/2003 | Chowdhury |
| 6,645,077 B2 | 11/2003 | Rowe |
| 6,648,755 B1 | 11/2003 | Luciano, Jr. |
| 6,656,050 B2 | 12/2003 | Busch |
| 6,685,559 B2 | 2/2004 | Luciano |
| 6,843,720 B2 | 1/2005 | Luciano |
| 6,915,271 B1 | 7/2005 | Meyer et al. |
| 6,929,550 B2 | 8/2005 | Hisada |
| 7,025,674 B2 | 4/2006 | Adams |
| 7,128,652 B1 | 10/2006 | Lavoie |
| 7,134,959 B2 | 11/2006 | Penrice |
| 7,137,883 B1 | 11/2006 | Falciglia |
| 7,146,342 B1 | 12/2006 | Angelin |
| 7,200,571 B1 | 4/2007 | Jenniges et al. |
| 7,249,139 B2 | 7/2007 | Chuah |
| 7,291,064 B2 | 11/2007 | Yamada |
| 7,387,571 B2 | 6/2008 | Walker |
| 7,390,264 B2 | 6/2008 | Walker |
| 7,455,586 B2 | 11/2008 | Nguyen |
| 7,703,673 B2 | 4/2010 | Buchheit et al. |
| 8,123,127 B2 | 2/2012 | McGhie et al. |
| 8,162,209 B2 | 4/2012 | Buchheit et al. |
| 8,181,863 B1 | 5/2012 | McGhie et al. |
| 8,181,864 B1 | 5/2012 | McGhie et al. |
| 8,186,583 B1 | 5/2012 | McGhie et al. |
| 8,201,734 B1 | 6/2012 | McGhie et al. |
| 2001/0034259 A1 | 10/2001 | Luciano et al. |
| 2001/0034649 A1 | 10/2001 | Acres |
| 2001/0041610 A1 | 11/2001 | Luciano et al. |
| 2001/0044337 A1 | 11/2001 | Rowe |
| 2001/0046891 A1 | 11/2001 | Acres |
| 2001/0054003 A1 | 12/2001 | Chen |
| 2002/0002532 A1* | 1/2002 | Tso .................................. 705/39 |

| | | | |
|---|---|---|---|
| 2002/0002538 A1 | 1/2002 | Ling | |
| 2002/0010025 A1 | 1/2002 | Kelly et al. | |
| 2002/0020965 A1 | 2/2002 | Potter | |
| 2002/0065126 A1 | 5/2002 | Miller et al. | |
| 2002/0068624 A1 | 6/2002 | Ellis | |
| 2002/0072412 A1 | 6/2002 | Young | |
| 2002/0077173 A1 | 6/2002 | Luciano et al. | |
| 2002/0086733 A1 | 7/2002 | Wang | |
| 2002/0111210 A1 | 8/2002 | Luciano, Jr. | |
| 2002/0111907 A1 | 8/2002 | Ling | |
| 2002/0160838 A1 | 10/2002 | Kim | |
| 2002/0169021 A1 | 11/2002 | Urie | |
| 2002/0198043 A1 | 12/2002 | Chowdhury | |
| 2003/0003996 A1 | 1/2003 | Nguyen | |
| 2003/0060264 A1 | 3/2003 | Chilton | |
| 2003/0083943 A1* | 5/2003 | Adams et al. | 705/14 |
| 2004/0006531 A1 | 1/2004 | Kwan | |
| 2004/0043806 A1 | 3/2004 | Kirby | |
| 2004/0111346 A1 | 6/2004 | Mcbeath | |
| 2005/0043082 A1 | 2/2005 | Peterson | |
| 2005/0107155 A1* | 5/2005 | Potts et al. | 463/25 |
| 2005/0137015 A1 | 6/2005 | Rogers | |
| 2005/0143174 A1 | 6/2005 | Goldman | |
| 2005/0177428 A1 | 8/2005 | Ganz | |
| 2005/0177519 A1* | 8/2005 | Block | 705/65 |
| 2005/0182693 A1 | 8/2005 | Alivandi | |
| 2005/0192864 A1 | 9/2005 | Ganz | |
| 2005/0250415 A1 | 11/2005 | Barthold | |
| 2006/0035692 A1 | 2/2006 | Kirby | |
| 2006/0046827 A1 | 3/2006 | Saffari | |
| 2006/0052150 A1* | 3/2006 | Hedrick et al. | 463/16 |
| 2006/0063580 A1 | 3/2006 | Nguyen | |
| 2006/0079150 A1 | 4/2006 | Filoseta | |
| 2006/0100018 A1 | 5/2006 | Ganz | |
| 2006/0178217 A1 | 8/2006 | Jung | |
| 2006/0178899 A1 | 8/2006 | Jung | |
| 2006/0178964 A1 | 8/2006 | Jung | |
| 2006/0178965 A1 | 8/2006 | Jung | |
| 2006/0178966 A1 | 8/2006 | Jung | |
| 2006/0178967 A1 | 8/2006 | Jung | |
| 2006/0178968 A1 | 8/2006 | Jung | |
| 2006/0178970 A1 | 8/2006 | Jung | |
| 2006/0178972 A1 | 8/2006 | Jung | |
| 2006/0178975 A1 | 8/2006 | Jung | |
| 2006/0178985 A1 | 8/2006 | Jung | |
| 2006/0195376 A1 | 8/2006 | Jung | |
| 2006/0195377 A1 | 8/2006 | Jung | |
| 2006/0195378 A1 | 8/2006 | Jung | |
| 2006/0195394 A1 | 8/2006 | Jung | |
| 2006/0224505 A1 | 10/2006 | Jung | |
| 2006/0229976 A1 | 10/2006 | Jung | |
| 2007/0073582 A1 | 3/2007 | Jung | |
| 2007/0087822 A1* | 4/2007 | Van Luchene | 463/25 |
| 2007/0167218 A1 | 7/2007 | Rothschild | |
| 2007/0168266 A1 | 7/2007 | Questembert | |
| 2008/0086759 A1 | 4/2008 | Colson | |
| 2010/0227675 A1* | 9/2010 | Luxton et al. | 463/25 |
| 2010/0248823 A1 | 9/2010 | Smith | |
| 2011/0151976 A1 | 6/2011 | Holloway | |
| 2011/0183749 A1 | 7/2011 | Allen | |
| 2011/0207525 A1 | 8/2011 | Allen | |
| 2011/0256924 A1 | 10/2011 | McGhie et al. | |

FOREIGN PATENT DOCUMENTS

| | | |
|---|---|---|
| AU | 199924973 | 11/1999 |
| AU | 199924974 | 11/1999 |
| AU | 199924975 | 11/1999 |
| AU | 200030185 | 11/2000 |
| EP | 0525363 | 2/1993 |
| EP | 0949596 | 10/1999 |
| GB | 2319381 | 5/1998 |
| GB | 2333879 | 8/1999 |
| WO | WO9215174 A1 | 3/1992 |
| WO | 9748078 | 12/1997 |
| WO | 0031658 | 6/2000 |
| WO | 0164306 | 9/2001 |

OTHER PUBLICATIONS

Non Final Rejection dated May 4, 2012; U.S. Appl. No. 13/428,656; pp. 1-6.

Notice of Allowance; U.S. Appl. No. 13/428,656; Mailing Date May 15, 2012.

Non Final Rejection dated Mar. 6, 2012; U.S. Appl. No. 13/359,120; pp. 1-7.

Notice of Allowance; U.S. Appl. No. 13/359,120; Mailing Date Apr. 18, 2012.

Non Final Rejection dated Mar. 12, 2012; U.S. Appl. No. 13/359,104; pp. 1-8.

Notice of Allowance; U.S. Appl. No. 13/359,104; Mailing Date Apr. 13, 2012.

Non Final Rejection dated Mar. 6, 2012; U.S. Appl. No. 13/359,080; pp. 1-11.

Notice of Allowance; U.S. Appl. No. 13/359,080; Mailing date Apr. 11, 2012.

Non Final Rejection dated Jan. 10, 2012; U.S. Appl. No. 12/759,506; pp. 1-10.

Notice of Allowance; U.S. Appl. No. 12/759,506; Mail date Mar. 5, 2012.

Non Final Rejection dated Dec. 15, 2012; U.S. Appl. No. 12/720,743; pp. 1-10.

Notice of Allowance; U.S. Appl. No. 12/720,743; Mailing date Jan. 24, 2012.

Non Final Rejection dated May 12, 2009; U.S. Appl. No. 11/420,255; pp. 1-7.

Notice of Allowance; U.S. Appl. No. 11/420,255; Mailing Date Dec. 16, 2009.

* cited by examiner

EXCHANGE OF NON-NEGOTIABLE CREDITS FOR ENTITY INDEPENDENT FUNDS

CROSS-REFERENCE TO RELATED APPLICATIONS

This continuation application claims the benefit of U.S. patent application Ser. No. 11/420,255 filed 25 May 2006 entitled "Web Based Conversion of Non-Negotiable Credits Associated with an Entity to Entity Independent Negotiable Funds." The entire contents of U.S. application Ser. No. 11/420,255 are incorporated by reference herein.

BACKGROUND

The present disclosure relates to the field of exchanging non-negotiable credits from funds.

Entities often reward consumers for utilizing their services with non-negotiable credits, such as frequent flier miles, consumer loyalty points, and entertainment credits. These non-negotiable credits can be applied towards products and/or services provided by a granting entity or its affiliates. For example, consumers can apply frequent flyer credits towards the purchase of airline tickets or airline upgrades. In another example, a consumer can utilize purchase points from a credit card company to receive percentage discounts on goods provided by affiliates. In still another example, entertainment credits can be redeemed for prizes offered in a winnings storefront of an entertainment site.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective. For instance, airlines often limit the choice of travel dates, known as black-out dates, to which frequent flyer credits can be applied.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

Time can also be a factor for redeeming credits having an associated expiration date. A consumer's non-negotiable credits may expire before a sufficient quantity is acquired for a desired purchase. Lesser purchases requiring fewer credits may not have a significant appeal for the consumer. Hence, credit expiration dates can further decrease the consumer value of non-negotiable credits.

Yet another problem with conventional implementation of non-negotiable credits is that consumers often belong to multiple credit-earning programs that provide the consumers with multiple incompatible forms of non-negotiable credit. Each of these multiple programs can span a single industry or can span multiple industries. For example, a consumer can acquire a moderate number of frequent flyer miles with multiple airlines, where each airline specific account contains insufficient credits to have any meaningful consumer value. Consumers can also have many different types of non-negotiable credits, such as multiple merchant specific credit, credit card credits, and frequent flier miles, each having different redemption values and program redemption rules. These different programs, values, and rules can understandably confuse and frustrate consumers, who due to their confusion, often elect to avoid participating in an entity sponsored credit program.

DETAILED DESCRIPTION

Figure 1:
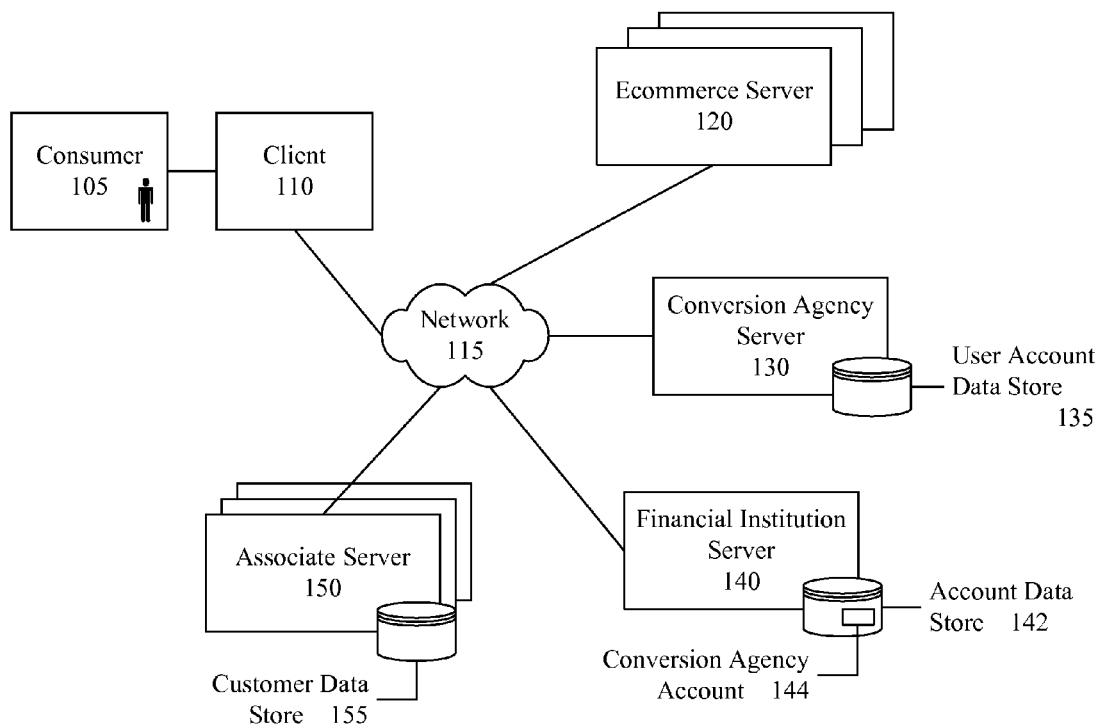
FIG. 1 is a schematic diagram of a Web based conversion of non-negotiable credits associated with an entity to entity independent funds system in accordance with an embodiment of the inventive arrangements disclosed herein.

The present disclosure permits consumers to transform non-negotiable credits provided by an entity to negotiable funds in an approximately immediate fashion using the Web. More specifically, a conversion agency can function as an intermediary that converts entity provided credits into entity independent funds. The conversion agency can be an independent entity that is not directly affiliated with the credit providing entities.

The conversion can occur automatically using a Web initiated action and can have approximately immediate results. Approximately immediate as used herein can signify that a transaction can occur within a single Web session with user acceptable delay tolerances, typically under half an hour and often under a few minutes. In one embodiment, credits can be automatically converted to funds as part of an e-commerce checkout. In another embodiment, credits can be converted into a user accessible account held with a financial institution.

The present disclosure can be implemented in accordance with numerous aspects consistent with material presented herein. For example, one aspect of the present disclosure can include a method for converting credits to funds. The method can include a step of a Web site receiving user identification information. Non-negotiable credits can be identified that are associated with an entity with which the user has previously interacted. The previous interactions could have earned the non-negotiable credits. Responsive to a user request, a conversion agency can convert a quantity of the non-negotiable credits into a quantity of negotiable funds. The conversion agency can be an agency not directly associated with the entity. The user can be permitted to access the quantity of negotiable funds. The quantity of negotiable funds can be applied to user specified purchases. At least a portion of the purchases can involve at least one vender that does not honor the non-negotiable credits.

Another aspect of the present disclosure can include a software method for converting non-negotiable credits into negotiable funds. The method can receive a user request to convert a quantity of non-negotiable credits held in a user account associated with an entity. A conversion rate between the non-negotiable credits available to the user and a form of negotiable funds can be automatically determined. A quantity of non-negotiable credits can be automatically subtracted from the user account. A quantity of the negotiable funds based upon the determined conversion rate and quantity of subtracted funds can be automatically transferred to a financial account. The financial account can be an account that is not associated with the entity. The entire method can occur in an approximately immediate fashion.

Still another aspect of the present disclosure can include a Web-based credit to fund conversion system. The system can include a non-negotiable credit account, a negotiable funds account, and a conversion agency. The non-negotiable credit account can be associated with an entity. Non-negotiable credits contained within the non-negotiable credit account can be earned though previous interactions between a user and the entity. The negotiable funds account can include negotiable funds that the user is able to apply to user specified e-commerce purchases. One or more venders involved in the e-commerce purchases can be venders that do not honor the non-negotiable credits for the e-commerce purchases. The conversion agency can automatically and approximately immediately convert a quantity of credits from the non-negotiable credit account to a quantity of funds in the negotiable funds account responsive to a request from the user.

It should be noted that various aspects of the disclosure can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

FIG. 1 is a schematic diagram of a Web based conversion of non-negotiable credits associated with an entity to entity independent funds system 100 in accordance with an embodiment of the inventive arrangements disclosed herein. System 100 includes consumer 105 and conversion agency server 130.

Consumer 105 interacts with conversion agency server 130 via client 110. Client 110 can be any of a variety of interfaces including, but not limited to, another human being, a personal computer, a kiosk, a graphical user interface (GUI), a Web page, a telephone, a personal data assistant (PDA), a mobile phone, and the like.

Client 110 can operate in a stand-alone fashion. Alternatively, client 110 can be a device that cooperatively participates in a network of distributed computing devices. Client 110 can also be another human being utilizing an alternate form of Client 110 to access conversion agency server 130 via network 115. Network 115 can facilitate data exchanges over wireless as well as line-based communication pathways and protocols.

Both consumer 105 and conversion agency server 130 can interact with associate server 150, e-commerce server 120, and financial institution server 140 via network 115. Conversion agency server 130 includes user account data store 135 in which consumer 105 is a member. Associate server 150 includes customer data store 155 in which consumer 105 is a member. Financial institution server 140 includes account data store 142. Account data store 142 includes conversion agency account 144 corresponding to conversion agency 130.

Consumer 105 earns non-negotiable credits from associate server 150. The quantity of these non-negotiable credits is saved in customer data store 155. The method in which consumer 105 earns credits can be any of a variety of activities including, but not limited to, making online purchases, making in-store purchases, playing online games, participating in online games of chance, participating in surveys, and the like. Consumer 105 uses conversion agency server 130 to convert the non-negotiable credits from associate server 150 into negotiable funds provided by e-commerce server 120 or financial institution 140. In one embodiment, conversion agency 130 can include multiple reward accounts of consumer 105.

For example, consumer 105 earns five hundred credits from participating in an online game of chance hosted by associate server 150. Consumer 105 can choose to use conversion agency 130 to convert any or all of these credits to a monetary equivalent. Conversion agency 130 withdraws the necessary amount from conversion agency account 144 contained within the account data store 142 of financial institution 140 and transfers it to an account specified by consumer 105. In another example, consumer 105 uses conversion agency 130 to complete a purchase at e-commerce server 120. Again, conversion agency 130 withdraws the necessary amount from conversion agency account 144 contained within the account data store 142 of financial institution 140 and transfers it to the account of e-commerce server 120.

E-commerce server 120 can be any Web site that supports online purchases of goods or services. In one embodiment, e-commerce server 120 can include a distinct payment option for conversion agency 130. This distinct payment option could process the conversion of credits through their Web site. Alternatively, the distinct payment option could launch an application to process the conversion of credit that is separate from their Web site. In another embodiment, associate server 150 can act as e-commerce server 120.

Financial institution server 140 can be any of a variety of entities including, but not limited to, a bank, a credit card company, an investment firm, and the like. In one embodiment, financial institution server 140 can reside in the same country as consumer 105 and/or associate server 150. In another embodiment, financial institution server 140 can reside in a country other than that of consumer 105 and/or associate server 150.

Figure 2:
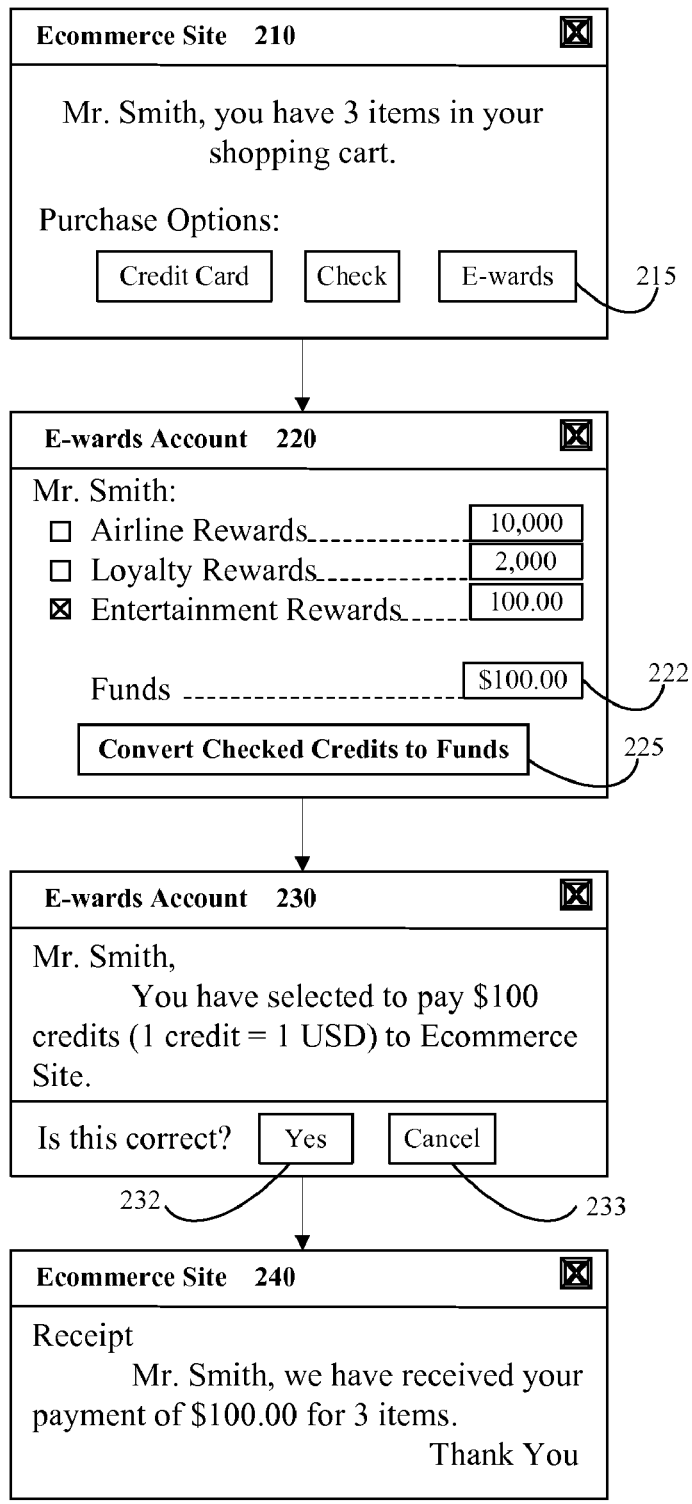
FIG. 2 is a schematic diagram of successive GUIs that illustrate the Web based conversion of non-negotiable credits associated with an entity to entity independent funds system in accordance with an embodiment of the inventive arrangements disclosed herein.

FIG. 2 is a schematic diagram of successive GUIs that illustrate the Web based conversion of non-negotiable credits associated with an entity to entity independent funds system 200 in accordance with an embodiment of the inventive arrangements disclosed herein.

GUI 210 can be a checkout window from any e-commerce site. GUI 210 includes payment button 215. Payment button 215 can represent a payment option that includes the conversion of non-negotiable credits to purchase the items in the shopping cart. Selection of payment button 215 by a user can produce GUI 220.

GUI 220 can be a display window from a conversion agency. GUI 220 includes display box 222 and button 225. GUI 220 can be rendered by any of a variety of means including, but not limited to, a Web browser, a JAVA applet, a PERL script, and the like. In one embodiment, GUI 220 can be contained within the e-commerce site.

GUI 220 can display the balance of non-negotiable credits from one or more reward programs. GUI 220 contains a means by which the user selects the type of non-negotiable credits to convert including, but not limited to, a set of radio buttons, a set of checkboxes, a highlighting mechanism, and the like. Display box 222 can display the monetary value of the selected non-negotiable credits. The value displayed in display box 222 can be based on preset conversion factors. Button 225 can represent the initiation of the process by which the selected non-negotiable credits are converted to negotiable funds. Selection of button 225 by a user can produce GUI 230.

GUI 230 can be a display window from a conversion agency. GUI 230 includes yes button 232 and cancel button 233. GUI 230 can be rendered by any of a variety of means including, but not limited to, a Web browser, a JAVA applet, a PERL script, and the like. In one embodiment, GUI 230 can be contained within the e-commerce site. GUI 230 can display a summary message of the transaction initiated by GUI 220. GUI 230 can include a means to continue the transaction, yes button 232, and a means to cancel the transaction, cancel button 233. Selection of cancel button 233 by a user cancels the transaction and can return the user to GUI 220. Selection of yes button 232 by a user completes the transaction initiated in GUI 220 and can produce GUI 240.

GUI 240 can be a display window from the same said e-commerce site. GUI 240 can contain a message acknowledging the successful conversion of the user's non-negotiable credits into negotiable funds for the purchase of the items in the shopping cart.

Figure 3:
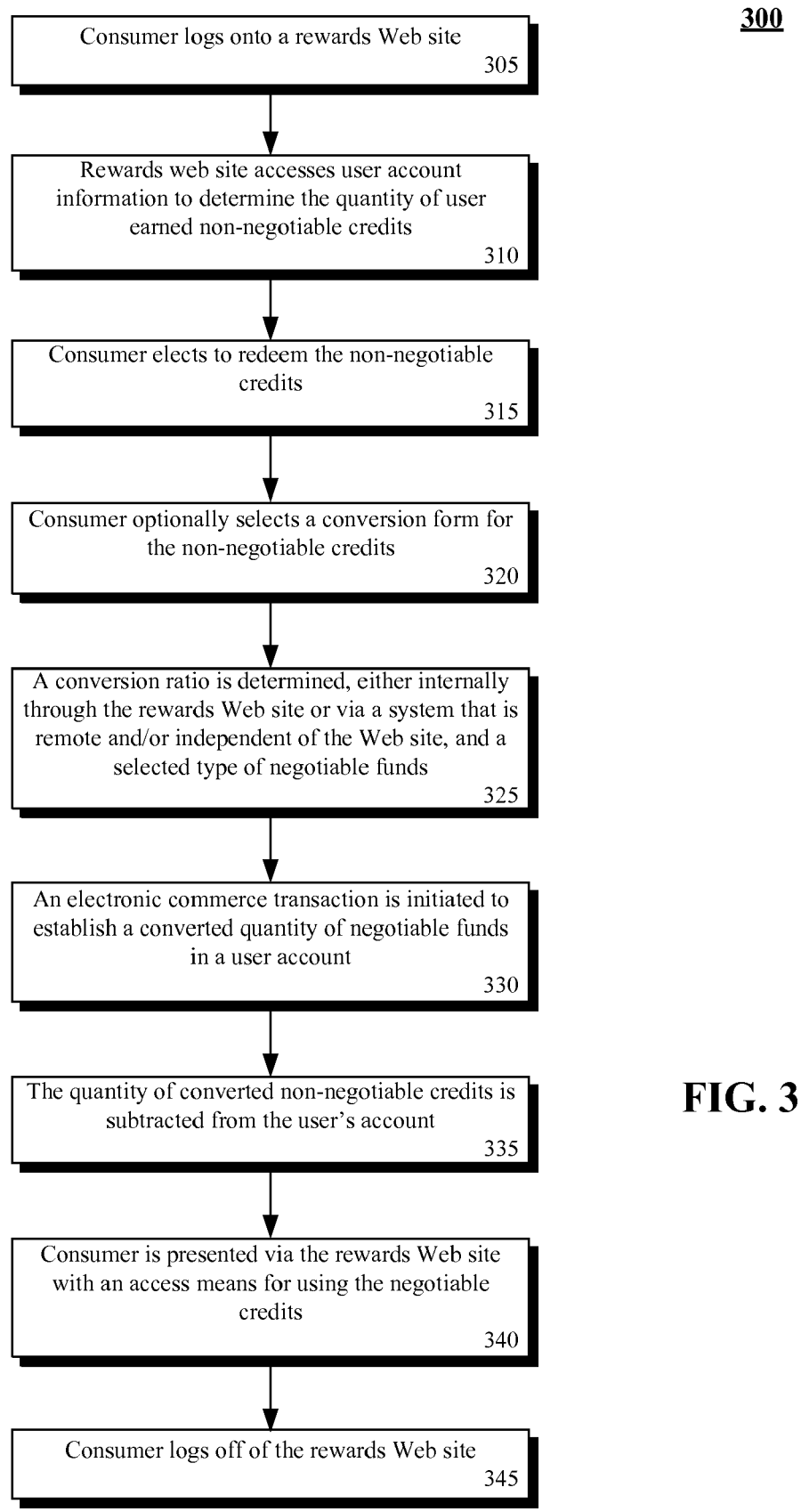
FIG. 3 is a flow chart of a method for the Web based conversion of non-negotiable credits associated with an entity to entity independent funds system in accordance with an embodiment of the inventive arrangements disclosed herein.

FIG. 3 is a flow chart of a method 300 for the Web based conversion of non-negotiable credits associated with an entity to entity independent funds system in accordance with an embodiment of the inventive arrangements disclosed herein.

Method 300 can begin in step 305, where a consumer logs onto a rewards Web site. In step 310, the rewards Web site utilizes the user information provided in step 305 to access the consumer's account information and display the amount of non-negotiable credits in the consumer's account. The consumer elects to redeem some quantity of non-negotiable credits in step 315. If supported by the rewards Web site, step 320 can occur in which the consumer can select the form of negotiable funds to convert the non-negotiable credits. In step 325, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 330 to establish the converted amount of negotiable funds in a user account. The quantity of converted non-negotiable credits is subtracted from the user's account in step 335. In step 340, the rewards Web site presents the consumer with an access means for the negotiable funds. Lastly, the consumer terminates the session by logging off the rewards Web site in step 345.

The present disclosure may be realized in hardware, software, or a combination of hardware and software. The present disclosure may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present disclosure also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This disclosure may be embodied in other forms without departing from the spirit or essential attributes thereof. Accordingly, reference should be made to the following claims, rather than to the foregoing specification, as indicating the scope of the disclosure.

What is claimed is:

1. A method comprising:
   a computer identifying non-negotiable credits earned from previous interactions with an entity, wherein records for the non-negotiable credits are maintained in a non-negotiable credit account stored in at least one storage device, wherein said non-negotiable credit account is owned or controlled by the entity;
   the computer converting a quantity of the non-negotiable credits of the non-negotiable credit account to a quantity of negotiable funds of a funds account stored in at least one storage device, wherein the funds account is not owned or controlled by the entity; and
   permitting access to the quantity of negotiable funds of the funds account, wherein the quantity of negotiable funds of the funds account are able to be applied to one or more purchases, wherein in absence of the converting the non-negotiable credits are not able to be applied to the one or more purchases, wherein permitting access to the quantity of negotiable funds is defined as:
   (a) the entity providing one or more users with cash, credit, or other negotiable funds, whereby the one or more users are able to thereafter apply the cash, credit, or other negotiable funds to the one or more purchases;
   (b) the entity providing a vender for the one or more purchases with cash, credit, or other negotiable funds, whereby one or more users are able to purchase goods or services from the vender using the entity provided cash, credit, or other negotiable funds; or
   (c) combinations of (a) and (b).

2. The method of claim 1, wherein the converting is performed by a different legal entity than the entity.

3. The method of claim 1, wherein the computer comprises computing equipment, wherein said computing equipment comprises at least one processor executing program instructions that are digitally encoded in at least one storage device.

4. The method of claim 1, wherein the computer converting the quantity of non-negotiable credits to negotiable funds comprises:
   the computer subtracting the quantity of the non-negotiable credits from the non-negotiable credit account; and
   the computer adding the quantity of funds to the funds account.

5. The method of claim 1, wherein the converting is performed by a conversion agency that is not the entity.

6. The method of claim 1, wherein the converting is performed by a vender that provides goods or services to consumers engaged in the one or more purchases.

7. The method of claim 1, wherein the funds account is an account of a vender providing one or more goods or one or more services for the one or more purchases.

8. The method of claim 1, wherein the funds of the funds account are negotiable funds, wherein the non-negotiable credits have restrictions on use that prevent their being directly applied to the one or more purchases.

9. The method of claim 1, wherein the previous interactions with the entity through which the non-negotiable credits are earned are interactions involving a game provided by the entity.

10. A method comprising:
at least one processor, responsive to executing program instructions of at least one memory, determining a quantity of funds required for completion of a sale;
at least one processor, responsive to executing program instructions of at least one memory, reducing the quantity of funds required for completion of the sale by a second quantity of funds, wherein the second quantity of funds equals an amount of funds resulting from a conversion of a quantity of non-negotiable credits in accordance with a credits to funds ratio, wherein said non-negotiable credits are earned from previous interactions with an entity; and
at least one processor, responsive to executing program instructions of at least one memory, completing the sale based on a purchaser expending the quantity of non-negotiable credits for the sale and expending a quantity of funds at least equal to a difference of the first quantity minus the second quantity of funds, wherein said expended quantity of funds is less than the first quantity of funds, wherein the non-negotiable funds are not honored for the sale in absence of the quantity of non-negotiable credits being converted into the second quantity of funds.

11. The method of claim 10, wherein said first and second quantity of funds are negotiable funds.

12. The method of claim 10, wherein said sale is for an online purchase of goods or services.

13. The method of claim 10, wherein the previous interactions with the entity through which the non-negotiable credits are earned are interactions involving a game provided by the entity.

14. The method of claim 10, wherein the sale is not completed by the entity.

15. The method of claim 10, wherein the purchaser is an end-user that earned the non-negotiable credits through the previous interactions with the entity.

16. The method of claim 10, further comprising:
at least one processor, responsive to executing program instructions of at least one memory, initiating a redemption action that redeems the quantity of non-negotiable credits on behalf of a facilitator of the sale, wherein the redemption action results in the facilitator receiving:
the second quantity of funds;
the second quantity of funds minus a service fee;
the second quantity of funds minus a previously determined percentage for converting the credits to funds; or
the second quantity of funds minus a service fee and minus a previously determined percentage for converting the credits to funds.

17. The method of claim 10, a facilitator of the sale redeeming the non-negotiable credits from the entity for funds.

18. A method comprising:
at least one processor, responsive to executing program instructions of at least one memory, accessing a storage device containing information of a non-negotiable credit account associated with an entity, wherein non-negotiable credits of the non-negotiable credit account earned from previous interactions with the entity, wherein said non-negotiable funds have a restriction on their use;
at least one processor, responsive to executing program instructions of at least one memory, determining an availability of a quantity of the non-negotiable credits to be applied to a purchase even though the restriction on use prevents the non-negotiable funds from being directly applied to the purchase;
at least one processor, responsive to executing program instructions of at least one memory, accessing a second storage device containing information of a fund account, wherein funds of the fund account are applied to a cost of goods or services for the purchase, wherein the funds of the funds account do not have the restriction on use;
at least one processor, responsive to executing program instructions of at least one memory, subtracting the quantity of non-negotiable credits from the non-negotiable credit account, responsive to the purchase; and
at least one processor, responsive to executing program instructions of at least one memory, adding an amount of funds to the funds account resulting from converting the quantity of non-negotiable credits to funds in accordance with a credits to funds ratio, wherein said adding occurs responsive to the purchase.

19. The method of claim 18, wherein the subtracting and the adding are actions not taken by the entity.

20. The method of claim 18, wherein the purchase is an online shopping purchase.

21. The method of claim 18, wherein the funds are entity independent funds, and wherein the purchase occurs through an online marketplace.

22. A computer program product comprising:
one or more computer-readable, tangible storage devices;
program instructions, stored on at least one of the one or more storage devices, to identify non-negotiable credits earned from previous interactions with an entity, wherein records for the non-negotiable credits are maintained in a non-negotiable credit account stored in at least one storage device, wherein said non-negotiable credit account is owned or controlled by the entity;
program instructions, stored on at least one of the one or more storage devices, to convert a quantity of the non-negotiable credits of the non-negotiable credit account to a quantity of negotiable funds of a funds account stored in at least one storage device, wherein the funds account is not owned or controlled by the entity; and
program instructions, stored on at least one of the one or more storage devices, to permit access to the quantity of negotiable funds of the funds account, wherein the quantity of negotiable funds of the funds account are able to be applied to one or more purchases, wherein in absence of the converting the non-negotiable credits are not able to be applied to the one or more purchases, wherein permitting access to the quantity of negotiable funds is defined as:
(a) the entity providing one or more users with cash, credit, or other negotiable funds, whereby the one or more users are able to thereafter apply the cash, credit, or other negotiable funds to the one or more purchases;
(b) the entity providing a vender for the one or more purchases with cash, credit, or other negotiable funds, whereby one or more users are able to purchase goods or services from the vender using the entity provided cash, credit, or other negotiable funds; or (c) combinations of (a) and (b).

23. The computer program product of claim 22, wherein the converting is performed by a different legal entity than the entity.

24. The computer program product of claim 22, further comprising:
  program instructions, stored on at least one of the one or more storage devices, to subtract the quantity of the non-negotiable credits from the non-negotiable credit account; and
  program instructions, stored on at least one of the one or more storage devices, to add the quantity of funds to the funds account.

25. The computer program product of claim 22, wherein the converting is performed by a conversion agency that is not the entity.

26. The computer program product of claim 22, wherein the converting is performed by a vender that provides goods or services to consumers engaged in the one or more purchases.

27. The computer program product of claim 22, wherein the funds account is an account of a vender providing one or more goods or one or more services for the one or more purchases.

28. The computer program product of claim 22, wherein the funds of the funds account are negotiable funds, wherein the non-negotiable credits have restrictions on use that prevent their being directly applied to the one or more purchases.

29. The computer program product of claim 22, wherein the previous interactions with the entity through which the non-negotiable credits are earned are interactions involving a game provided by the entity.

30. A system comprising:
  one or more processors;
  one or more memories;
  program instructions, stored on at least one of the one or more memories executable by at least one of the one or more processors, to identify non-negotiable credits earned from previous interactions with an entity, wherein records for the non-negotiable credits are maintained in a non-negotiable credit account stored in at least one storage device, wherein said non-negotiable credit account is owned or controlled by the entity;
  program instructions, stored on at least one of the one or more memories executable by at least one of the one or more processors, to convert a quantity of the non-negotiable credits of the non-negotiable credit account to a quantity of negotiable funds of a funds account stored in at least one storage device, wherein the funds account is not owned or controlled by the entity; and
  program instructions, stored on at least one of the one or more memories executable by at least one of the one or more processors, to permit access to the quantity of negotiable funds of the funds account, wherein the quantity of negotiable funds of the funds account are able to be applied to one or more purchases, wherein in absence of the converting the non-negotiable credits are not able to be applied to the one or more purchases, wherein permitting access to the quantity of negotiable funds is defined as:
  (a) the entity providing one or more users with cash, credit, or other negotiable funds, whereby the one or more users are able to thereafter apply the cash, credit, or other negotiable funds to the one or more purchases;
  (b) the entity providing a vender for the one or more purchases with cash, credit, or other negotiable funds, whereby one or more users are able to purchase goods or services from the vender using the entity provided cash, credit, or other negotiable funds; or
  (c) combinations of (a) and (b).

31. The system of claim 30, wherein the converting is performed by a different legal entity than the entity.

32. The system of claim 30, further comprising:
  program instructions, stored on at least one of the one or more memories executable by at least one of the one or more processors, to subtract the quantity of the non-negotiable credits from the non-negotiable credit account; and
  program instructions, stored on at least one of the one or more memories executable by at least one of the one or more processors, to add the quantity of funds to the funds account.

33. The system of claim 30, wherein the converting is performed by a conversion agency that is not the entity.

34. The system of claim 30, wherein the converting is performed by a vender that provides goods or services to consumers engaged in the one or more purchases.

35. The system of claim 30, wherein the funds account is an account of a vender providing one or more goods or one or more services for the one or more purchases.

36. The system of claim 30, wherein the funds of the funds account are negotiable funds, wherein the non-negotiable credits have restrictions on use that prevent their being directly applied to the one or more purchases.

37. The system of claim 30, wherein the previous interactions with the entity through which the non-negotiable credits are earned are interactions involving a game provided by the entity.

38. A computer program product comprising:
  one or more computer-readable, tangible storage devices;
  program instructions, stored on at least one of the one or more storage devices, to determine a quantity of funds required for completion of a sale;
  program instructions, stored on at least one of the one or more storage devices, to reduce the quantity of funds required for completion of the sale by a second quantity of funds, wherein the second quantity of funds equals an amount of funds resulting from a conversion of a quantity of non-negotiable credits in accordance with a credits to funds ratio, wherein said non-negotiable credits are earned from previous interactions with an entity; and
  program instructions, stored on at least one of the one or more storage devices, to complete the sale based on a purchaser expending the quantity of non-negotiable credits for the sale and expending a quantity of funds at least equal to a difference of the first quantity minus the second quantity of funds, wherein said expended quantity of funds is less than the first quantity of funds, wherein the non-negotiable funds are not honored for the sale in absence of the quantity of non-negotiable credits being converted into the second quantity of funds.

39. The computer program product of claim 38, wherein said first and second quantity of funds are negotiable funds.

40. The computer program product of claim 38, wherein said sale is for an online purchase of goods or services.

41. The computer program product of claim 38, wherein the previous interactions with the entity through which the non-negotiable credits are earned are interactions involving a game provided by the entity.

42. The computer program product of claim 38, wherein the sale is not completed by the entity.

43. The computer program product of claim 38, wherein the purchaser is an end-user that earned the non-negotiable credits through the previous interactions with the entity.

44. The computer program product of claim 38, further comprising:
program instructions, stored on at least one of the one or more storage devices, to initiate a redemption action that redeems the quantity of non-negotiable credits on behalf of a facilitator of the sale, wherein the redemption action results in the facilitator receiving:
the second quantity of funds;
the second quantity of funds minus a service fee;
the second quantity of funds minus a previously determined percentage for converting the credits to funds; or
the second quantity of funds minus a service fee and minus a previously determined percentage for converting the credits to funds.

45. A system comprising:
one or more processors;
one or more memories;
program instructions, stored on at least one of the one or more memories executable by at least one of the one or more processors, to determine a quantity of funds required for completion of a sale;
program instructions, stored on at least one of the one or more memories executable by at least one of the one or more processors, to reduce the quantity of funds required for completion of the sale by a second quantity of funds, wherein the second quantity of funds equals an amount of funds resulting from a conversion of a quantity of non-negotiable credits in accordance with a credits to funds ratio, wherein said non-negotiable credits are earned from previous interactions with an entity; and
program instructions, stored on at least one of the one or more memories executable by at least one of the one or more processors, to complete the sale based on a purchaser expending the quantity of non-negotiable credits for the sale and expending a quantity of funds at least equal to a difference of the first quantity minus the second quantity of funds, wherein said expended quantity of funds is less than the first quantity of funds, wherein the non-negotiable funds are not honored for the sale in absence of the quantity of non-negotiable credits being converted into the second quantity of funds.

46. The system of claim 45, wherein said first and second quantity of funds are negotiable funds.

47. The system of claim 45, wherein said sale is for an online purchase of goods or services.

48. The system of claim 45, wherein the previous interactions with the entity through which the non-negotiable credits are earned are interactions involving a game provided by the entity.

49. The system of claim 45, wherein the sale is not completed by the entity.

50. The system of claim 45, wherein the purchaser is an end-user that earned the non-negotiable credits through the previous interactions with the entity.

51. The system of claim 45, further comprising:
program instructions, stored on at least one of the one or more memories executable by at least one of the one or more processors, to initiate a redemption action that redeems the quantity of non-negotiable credits on behalf of a facilitator of the sale, wherein the redemption action results in the facilitator receiving:
the second quantity of funds;
the second quantity of funds minus a service fee;
the second quantity of funds minus a previously determined percentage for converting the credits to funds; or
the second quantity of funds minus a service fee and minus a previously determined percentage for converting the credits to funds.

52. The system of claim 45, program instructions, stored on at least one of the one or more storage devices, to cause a facilitator of the sale to redeem the non-negotiable credits from the entity for funds.

53. A computer program product comprising:
one or more computer-readable, tangible storage devices;
program instructions, stored on at least one of the one or more storage devices, to access a storage device containing information of a non-negotiable credit account associated with an entity, wherein non-negotiable credits of the non-negotiable credit account earned from previous interactions with the entity, wherein said non-negotiable funds have a restriction on their use;
program instructions, stored on at least one of the one or more storage devices, to determine an availability of a quantity of the non-negotiable credits to be applied to a purchase even though the restriction on use prevents the non-negotiable funds from being directly applied to the purchase;
program instructions, stored on at least one of the one or more storage devices, to access a second storage device containing information of a fund account, wherein funds of the fund account are applied to a cost of goods or services for the purchase, wherein the funds of the funds account do not have the restriction on use;
program instructions, stored on at least one of the one or more storage devices, to subtract the quantity of non-negotiable credits from the non-negotiable credit account, responsive to the purchase; and
program instructions, stored on at least one of the one or more storage devices, to add an amount of funds to the funds account resulting from converting the quantity of non-negotiable credits to funds in accordance with a credits to funds ratio, wherein said adding occurs responsive to the purchase.

54. The computer program product of claim 53, wherein the subtracting and the adding are actions not taken by the entity.

55. The computer program product of claim 53, wherein the purchase is an online shopping purchase.

56. The computer program product of claim 53, wherein the funds are entity independent funds, and wherein the purchase occurs through an online marketplace.

57. A system comprising:
one or more processors;
one or more memories;
program instructions, stored on at least one of the one or more memories executable by at least one of the one or more processors, to access a storage device containing information of a non-negotiable credit account associated with an entity, wherein non-negotiable credits of the non-negotiable credit account earned from previous interactions with the entity, wherein said non-negotiable funds have a restriction on their use;
program instructions, stored on at least one of the one or more memories executable by at least one of the one or more processors, to determine an availability of a quantity of the non-negotiable credits to be applied to a purchase even though the restriction on use prevents the non-negotiable funds from being directly applied to the purchase;

program instructions, stored on at least one of the one or more memories executable by at least one of the one or more processors, to access a second storage device containing information of a fund account, wherein funds of the fund account are applied to a cost of goods or services for the purchase, wherein the funds of the funds account do not have the restriction on use;

program instructions, stored on at least one of the one or more memories executable by at least one of the one or more processors, to subtract the quantity of non-negotiable credits from the non-negotiable credit account, responsive to the purchase; and program instructions, stored on at least one of the one or more memories executable by at least one of the one or more processors, to add an amount of funds to the funds account resulting from converting the quantity of non-negotiable credits to funds in accordance with a credits to funds ratio, wherein said adding occurs responsive to the purchase.

58. The system of claim 57, wherein the subtracting and the adding are actions not taken by the entity.

59. The system of claim 57, wherein the purchase is an online shopping purchase.

60. The system of claim 57, wherein the funds are entity independent funds, and wherein the purchase occurs through an online marketplace.

\* \* \* \* \*

UNITED STATES PATENT AND TRADEMARK OFFICE
CERTIFICATE OF CORRECTION

PATENT NO. : 8,267,315 B1  
APPLICATION NO. : 13/479417  
DATED : September 18, 2012  
INVENTOR(S) : Sean I. McGhie and Brian K. Buchheit Page 1 of 1

It is certified that error appears in the above-identified patent and that said Letters Patent is hereby corrected as shown below:

On the Title Page, Item (63)

In the RELATED U.S. APPLICATION DATA the words: "continuation of Application No. 11/420,255, filed on May 25, 2006, now Pat. No. 7,703,673"

should be replaced with: "continuation of Application No. 11/420,255, filed on May 25, 2006, now Pat. No. 7,703,673, and a continuation of Application No. 12/720,743, filed on March 10, 2010, now Pat. No. 8,123,127 and a continuation of Application No. 13/168,814, filed on June 24, 2011, now Pat. No. 8,376,224."

In the Specification

Column 1, lines 8-13

In the CROSS-REFERENCE TO RELATED APPLICATIONS the words: "This continuation application claims the benefit of U.S. patent Ser. No. 11/420,255 filed May 2006 entitled "Web Based Conversion of Non-Negotiable Credits Associated with an Entity to Entity Independent Negotiable Funds. The entire contents of U.S. Application Ser. No. 11/420,255 are incorporated by reference herein."

should be replaced with: "This continuation application claims the benefit of U.S. patent Ser. No. 11/420,255 filed May 2006 entitled "Web Based Conversion of Non-Negotiable Credits Associated with an Entity to Entity Independent Negotiable Funds", now Pat No. 7,703,673. Priority to Pat. No 7,703,673 is through Pat. No. 8,876,224 (filed June 24, 2011 and issued February 19, 2013, which claims priority to Patent No. 7,703,673 through Pat. No 7,123,127 and Pat. No 8,162,209). The entire contents of U.S. Application Ser. No. 11/420,255 are incorporated by reference herein."

Signed and Sealed this  
Twenty-fifth Day of November, 2014

Michelle K. Lee  
*Deputy Director of the United States Patent and Trademark Office*